Oct. 30, 1951 M. O. MILLER 2,573,350
CAMERA APPARATUS FOR RACE TRACK PHOTOGRAPHY
Filed Dec. 20, 1949 2 SHEETS—SHEET 1

MAX O. MILLER,
INVENTOR.

BY W E Beatty

ATTORNEY.

Oct. 30, 1951 M. O. MILLER 2,573,350
CAMERA APPARATUS FOR RACE TRACK PHOTOGRAPHY
Filed Dec. 20, 1949 2 SHEETS—SHEET 2
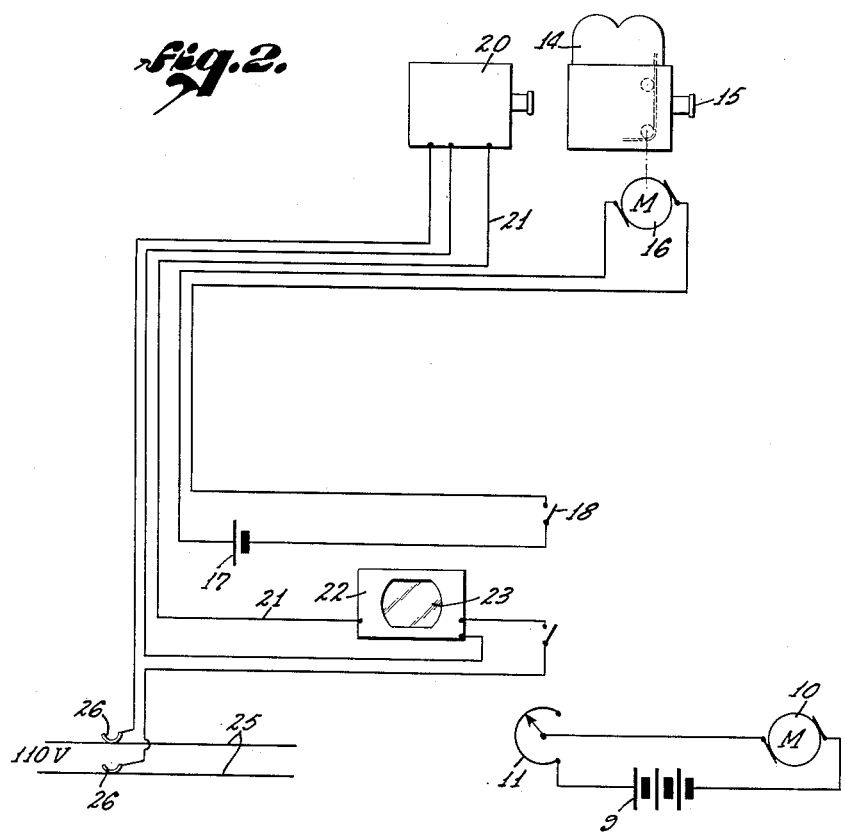
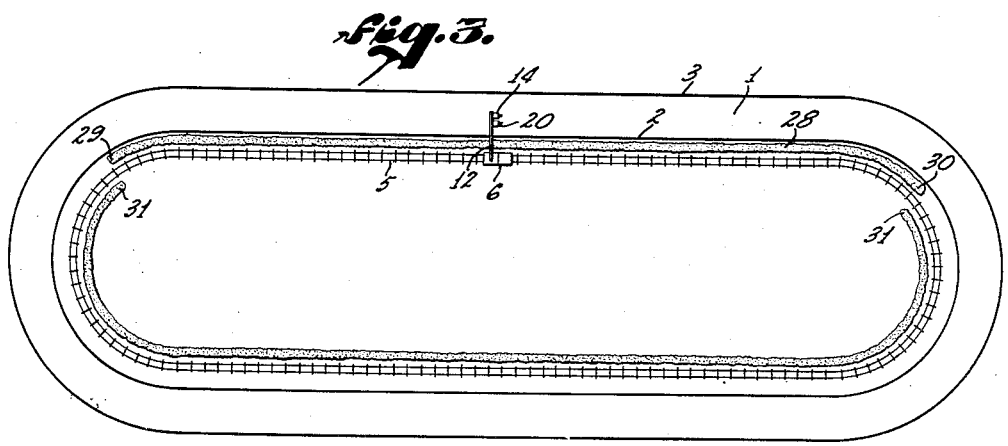
MAX O. MILLER,
INVENTOR.
BY W E Beatty
ATTORNEY.

Patented Oct. 30, 1951

2,573,350

UNITED STATES PATENT OFFICE 2,573,350

CAMERA APPARATUS FOR RACE TRACK PHOTOGRAPHY

Max O. Miller, Los Angeles, Calif., assignor to Motoview, Inc., Carson City, Nev., a corporation of Nevada Application December 20, 1949, Serial No. 134,031

1 Claim. (Cl. 88—16)

The invention relates to camera apparatus and more particularly to camera apparatus adapted to photograph a horse race or similar sporting event.

An object of the invention is to provide camera apparatus for photographing a head-on view of the race in order to detect fouls of the jockeys and also to provide a picture having the appearance of having been taken by a camera car proceeding in front of the race on the race track.

A further object is to provide camera apparatus of the character described wherein the major portion of the apparatus is concealed from the view of the spectators in the grandstand and out of the normal vision of the race horses or similar contestants.

For further details of the invention reference may be made to the drawings wherein—

Fig. 2 is a schematic wiring diagram of the apparatus of Fig. 1.

Fig. 3 is a plan view of a race track having the camera apparatus illustrated in the other figures.

Figure 1:
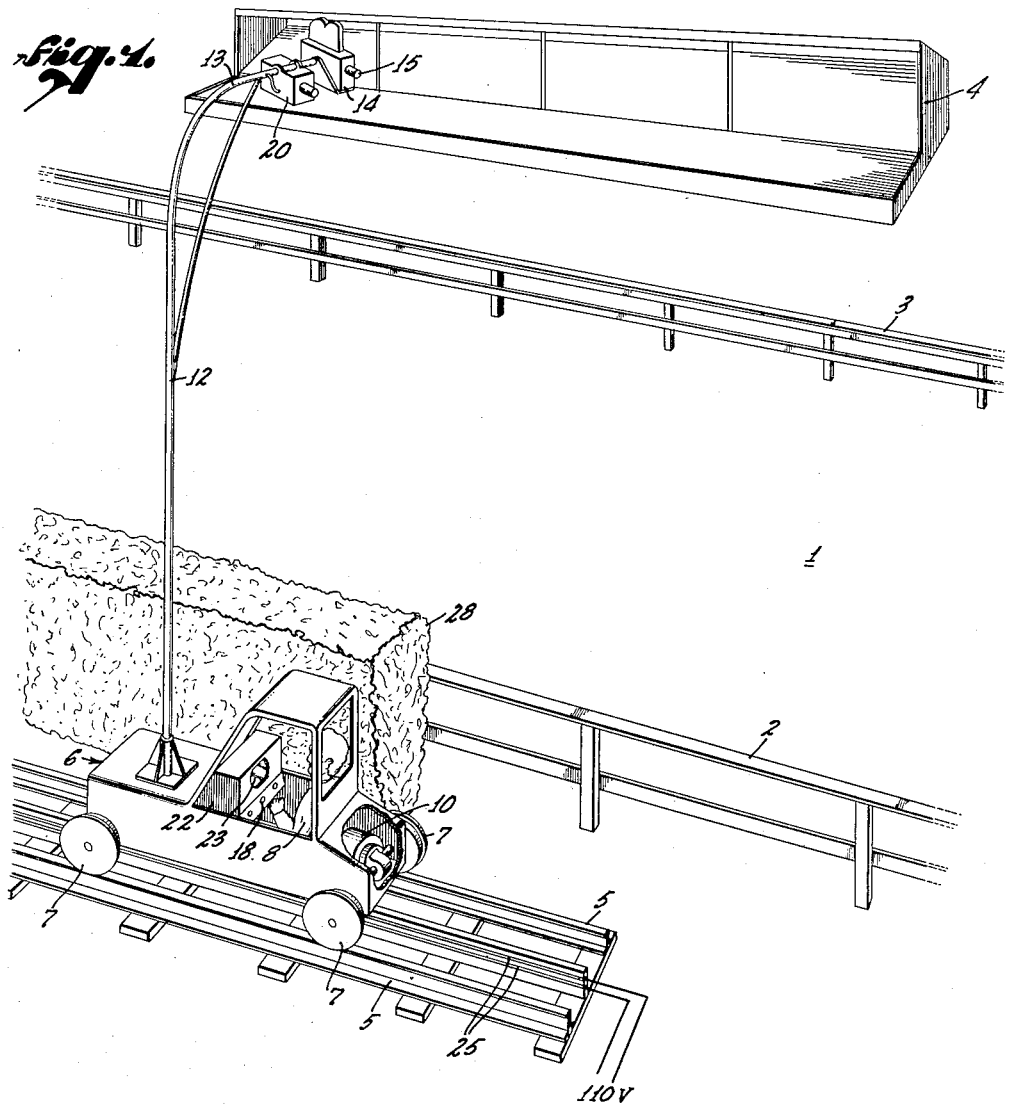
Fig. 1 is a perspective view with parts broken away of camera apparatus according to the present invention.

Referring in detail to the drawings, the race track 1 for horses or the like is shown as having the usual inside rail 2, outside rail 3 and grandstand 4. Around the in-field, that is, inside of and close to the inner rail 2 is arranged a track 5 on the ground for an automobile or car 6 having wheels 7 which run on the rails of track 5. Wheels 7 may have rubber tires. The car 6 is of special construction or is of a very low type, viz. having a height of 3 feet or less so that it is concealed from the view of the spectators in the grandstand 4 by suitable scenery such as a hedge 28 at the inside of the rail 2. Hedge 28 is slightly higher than car 6, viz., 4 feet. The car 6 is self-propelled and controlled by an operator indicated at 8. For example, the car 6 may have a storage battery 9 see Fig. 2, for the motor 10 which drives the wheels 7 through suitable gearing not shown. The speed of the car 6 is controlled by a speed controller 11.

Arranged on the car 6 is a column 12 which may be of the order of 30 feet in height, and having a laterally extending crossarm 13 having a motion picture camera 14 and a television camera 20 each arranged crosswise of the crossarm 13. The crossarm 13 is of sufficient length so that the motion picture camera 14 will extend about 6 feet beyond the rail 2 over the race track 1. The camera 14 has the usual lens 15 which points rearwardly, the car 6 being operated so as to maintain the camera 14 ahead of the oncoming race, which in this case is assumed to be from right to left on the portion of the track 1 shown in Fig. 1. As shown in Fig. 2, the camera 14 is driven by a motor 16 energized by a battery 17, which may be the same as battery 9 and arranged on the car 6. Starting and stopping of the camera 14 is controlled by a switch 18 accessible to the operator 8.

In order that the operator 8 may see substantially the same field of view as the camera 14 sees, along side of the camera on boom 13 is arranged a television camera 20 which is connected through suitable circuits well known as indicated at 21 in Fig. 2 to a television receiver 22 having a screen 23 in front of the operator 8. The power supply for the television camera 20 and the receiver 22 may be taken from bus bars 25 arranged along the track 5, and sliding contacts 26 arranged on the car 6. By means of suitable circuits not shown, the television signal picked up by the camera 20 may also be transmitted to other receiving sets.

The cameras 14 and 20 may be serviced by means of an automobile having an elevated platform and/or by running the car 6 on a side track not shown.

The invention thus provides for arranging camera apparatus over a race track while concealing the car from the spectators in the grandstand and from the horses or other contestants. During a race the horses are watching each other or the track ahead and, therefore, that part of the column 12 above the scenery 28 as well as the cameras 14 and 20 are out of the field of view of the horses.

Hedge 28 is on the outside of the track 5 between the track 5 and the inner rail 2. Hedge 28 may terminate at the ends of the field as indicated at 29 and 30, to be continued on the inside of the track 5 as indicated at 31, so that hedge 31 is in position to hide the car 6 from the view of the spectators when car 6 is at the ends of the track or at the side of the track opposite the grandstand.

Various modifications may be made in the invention without departing from the spirit of the following claim. For example, car 6 can run on the ground, the rails of track 5 and bus bar 25 being omitted, with a motor generator set operated by battery 9 and mounted on car 6 to generate the power supply for the television camera 20 and receivers like 22.

I claim:

Camera apparatus for a race track having an inner rail, said apparatus comprising a low type car adapted to travel inside of said inner rail, said car having an elevated post having a laterally extending crossarm having a length to extend over said inner rail, and a motion picture camera and television camera each arranged crosswise on said crossarm in position to overhang said track, the field of view of said cameras being substantially the same, said car having a driver's position, and a television receiver for said television camera, said receiver being arranged in front of said driver's position for depicting to the driver the field of view of said motion picture camera.

MAX O. MILLER.

REFERENCES CITED

The following references are of record in the file of this patent:

UNITED STATES PATENTS

| Number | Name | Date |
|---|---|---|
| 1,917,245 | Edwards et. al. | July 11, 1933 |
| 2,348,841 | Oswald | May 16, 1944 |
| 2,420,197 | Rosenthal | May 6, 1947 |
| 2,472,944 | Furer et al. | June 14, 1949 |

FOREIGN PATENTS

| Number | Country | Date |
|---|---|---|
| 504,750 | Great Britain | May 1, 1939 |